United States Patent [19]

Neumann

[11] Patent Number: 4,801,832

[45] Date of Patent: Jan. 31, 1989

[54] STATOR AND ROTOR LAMINATION CONSTRUCTION FOR A DYNAMO-ELECTRIC MACHINE

[75] Inventor: Thomas W. Neumann, Fort Wayne, Ind.

[73] Assignee: General Electric Company, Fort Wayne, Ind.

[21] Appl. No.: 116,303

[22] Filed: Nov. 4, 1987

[51] Int. Cl.$^4$ ............................................. H02K 1/00
[52] U.S. Cl. ..................... 310/216; 310/42; 310/184; 310/254; 310/261
[58] Field of Search ................... 310/42, 45, 216, 217, 310/179, 180, 184, 214, 215, 261, 264, 267, 211, 254, 258, 259

[56] References Cited

U.S. PATENT DOCUMENTS

| | | | |
|---|---|---|---|
| 2,125,970 | 8/1938 | Waters | 310/211 |
| 2,528,154 | 10/1950 | Ludwig | 310/211 |
| 2,778,964 | 1/1957 | Blake | 310/214 |
| 2,794,138 | 5/1957 | Dunn, Jr. | 310/261 |
| 3,122,667 | 2/1964 | Baciu | 310/45 |
| 3,401,280 | 9/1968 | Lackey | 310/42 |
| 3,457,445 | 7/1969 | Dochterman | 310/216 |
| 4,209,720 | 6/1980 | Ducrot | 310/45 |
| 4,365,178 | 12/1982 | Lenz | 310/216 |
| 4,566,179 | 1/1986 | Sawyer | 310/216 |
| 4,585,967 | 4/1986 | Mayer | 310/261 |

OTHER PUBLICATIONS

ANSI/NEMA Standards Publication No. MG-1-1987(R1981).

Primary Examiner—R. Skudy
Attorney, Agent, or Firm—Ralph E. Krisher, Jr.

[57] ABSTRACT

A dynamo-electric machine includes a stator core fixed in a casing and formed of stator lamination plates, and a rotor supported in a bore of the stator core and formed of a stack of rotor lamination plates. Each stator lamination plate has a tooth portion extending radially outward from the bore to an intermediate circumference, and a yoke portion defined between the intermediate circumference and the outer periphery of the stator lamination plate. Each of the rotor lamination plates has a number of equally circumferentially spaced closed slots, wherein each slot is defined by a curvilinear edge at an upper slot region adjacent the periphery of the plate. The curvilinear edge together with a pair of spaced parallel sides together define a top part of each slot, the top part opening into a bottom part of the slot which is substantially triangularly-shaped. In one embodiment the teeth of the stator lamination plates are sufficiently wide relative to the area of stator slot openings so that the ratio of flux density in the tooth portion to flux density in the yoke portion is optimized for a given n pole operating configuration of the stator winding.

12 Claims, 4 Drawing Sheets

LAMINATION CROSS SECTIONS

| | 180 FRAME | | 210 FRAME | |
|---|---|---|---|---|
| | 2 POLE | | 2 POLE | |
| | PRIOR ART | PRESENT INVENTION | PRIOR ART | PRESENT INVENTION |
| OD(in) | 7.478 | 7.992 | 8.775 | 9.528 |
| ID/OD | .535 | .5025 | .556 | .504 |
| $T_1/T_S$ | .450 | .543 | .404 | .532 |
| $BT_1/BY_1$ | 1.144 | 1.101 | 1.142 | 1.100 |
| $S_2T_2/S_1T_1$ | .808 | .850 | .903 | .850 |
| $W_{10}$ (in) | .100 | .102 | .125 | .126 |
| $S_1$ (NUMBER OF STATOR SLOTS) | 36 | 24 | 36 | 24 |
| $(S_1) \times$(A SLOT GROSS) (in²) | 5.86 | 5.77 | 8.39 | 8.60 |
| $(S_1) \times$(A SLOT NET) (in²) | 4.77 | 4.95 | 6.56 | 7.50 |
| $S_2$ (NUMBER OF ROTOR SLOTS) | 28 | 28 | 26 | 28 |

STATOR AND ROTOR LAMINATION CONSTRUCTION FOR A DYNAMO-ELECTRIC MACHINE

BACKGROUND OF THE INVENTION

1. Field of the Invention

The present invention relates generally to dynamo-electric machines with laminated rotors and stator cores, and more particularly to lamination constructions in which stator teeth and rotor slots have relative dimensions such as to provide improved output for a given size machine.

2. Description of the Known Art

Arrangements are known for improving efficiency or power output of dynamo-electric machines through the provision of certain slot distributions in either a stator or rotor core element of the machine, e.g. U.S. Pat. No. 4,566,179 (Jan. 28, 1986), or by creating a prescribed variation of magnetic flux through a pole of the machine stator relative to the ampere-turns of the pole such as in U.S. Pat. No. 4,209,720 (June 24, 1980). There has not, however, been available a machine lamination construction by which the operating efficiency of a dynamo-electric machine having a stacked laminated stator and/or rotor is improved by a prescribed ratio of inner diameter to outer diameter for the lamination. Also, there has not been available a lamination construction by which the ratio of flux density in a tooth portion of the lamination to flux density in a yoke portion of the lamination can be increased over that obtained conventionally, and, as a result, yield greater output or operating efficiency for the machine.

Rotors formed of a stack of laminations having closed slots equally spaced from one another about the periphery of each lamination are known from, for example, U.S. Pat. Nos. 2,794,138 (May 28, 1957) and 3,401,280 (Sept. 10, 1968), both having been assigned to the assignee of the present invention.

Such rotors are ordinarily used in inductive AC motors, wherein conducting members which extend axially along the rotor through aligned slots of the stacked laminations interact with a rotating magnetic field created in an air gap between the outer circumference of the rotor and the inner circumference of the machine stator. Windings embedded in stator slots between radially inwardly projecting teeth of the stator, adjacent the air gap, are connected to the AC mains, and the stator winding conductors pass through a certain order of the stator slots so as to cause magnetic flux in the air gap to rotate in synchronism with the frequency of the AC mains.

Conventionally, each of the rotor slots is constricted between its top and bottom parts in the radial direction, to form a so-called neck portion of the slot. Such closed slot rotors ordinarily have the slots in each of the rotor laminations formed with an inverted V shaped edge at the upper boundary of the top part of the slot, with the center of the V creating a narrow bridge part between the upper boundary of the slot and the outer circumference of the lamination. Understandably, such bridge part presents difficulties in machining of the closed slots at the peripheries of the rotor laminations.

SUMMARY OF THE INVENTION

An object of the invention is to provide a dynamo-electric machine construction in which improvement is obtained through a greater amount of lamination material for both the stator core and the rotor of the machine, with less winding conductors than used previously.

Another object of the invention is to provide a dynamo-electric machine in which leakage flux from end turns of a winding embedded in slots of a laminated core, is substantially reduced.

A further object of the invention is to provide a dynamo-electric machine which can achieve a greater horsepower to volume ratio than that previously obtained.

Another object of the invention is to provide a closed slot rotor lamination which can be manufactured without imposing costly production procedures.

According to the invention, a dynamo-electric machine includes a generally cylindrical casing and a stator core fixed in the casing and comprised of stator plate laminations. A stator winding is embedded in slots extending from the bore of the stator core and a rotor is supported in the bore, the rotor comprising rotor plate laminations with conductor means for interacting with a magnetic field produced in an air gap between the outer periphery of the rotor and the inner periphery of the stator core.

Each of the stator plate laminations is comprised of a flat annular plate of ferro-magnetic material with a pre-selected outer diameter and a generally circular inner opening of a pre-selected inner diameter. The stator plate lamination has a number of equally circumferentially spaced slots extending radially outwardly from the bore to an intermediate circumference of the plate to establish teeth between the slots. A tooth portion is defined by the teeth between the intermediate circumference and the bore, and a yoke portion is defined between the intermediate circumference and the outer periphery of the stator lamination plate.

Each of the rotor plate laminations is comprised of a flat circular plate of ferro-magnetic material with a number of equally circumferentially spaced closed slots extending radially near the outer periphery of the plate. Each of the slots is defined by a semi-circular or curvilinear edge at an upper slot region adjacent to the outer periphery of the plate and symmetrical about a radial center line. End points of the curvilinear edge are coincident with ends of spaced substantially parallel sides of the slot, which sides extend equal distances toward the center of the plate to define with the curvilinear edge a top part of the slot. The top part opens into a larger bottom part of the slot, which is substantially triangularly-shaped and symmetrical about the radial center line.

For a given ratio of the pre-selected inner diameter to the pre-selected outer diameter for the annular stator plate lamination, the stator teeth are sufficiently wide relative to the area of the stator slot openings so that the ratio of flux density in the tooth portion to flux density in the yoke portion is optimized for a given n pole operating configuration for the stator winding.

The various features of novelty which characterize the invention are pointed out with particularity in the claims annexed to and forming a part of the present disclosure. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWING

In the drawing: p

DETAILED DESCRIPTION OF THE INVENTION

Figure 1:
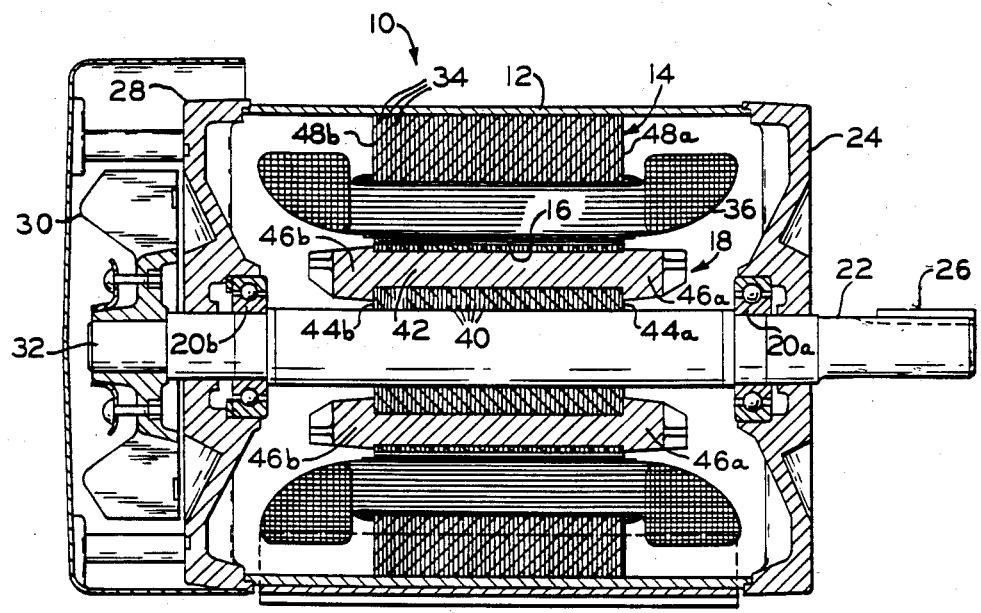
FIG. 1 is a side view, partly in section, of a dynamo-electric machine in which the present invention may be embodied.
Figure 2:
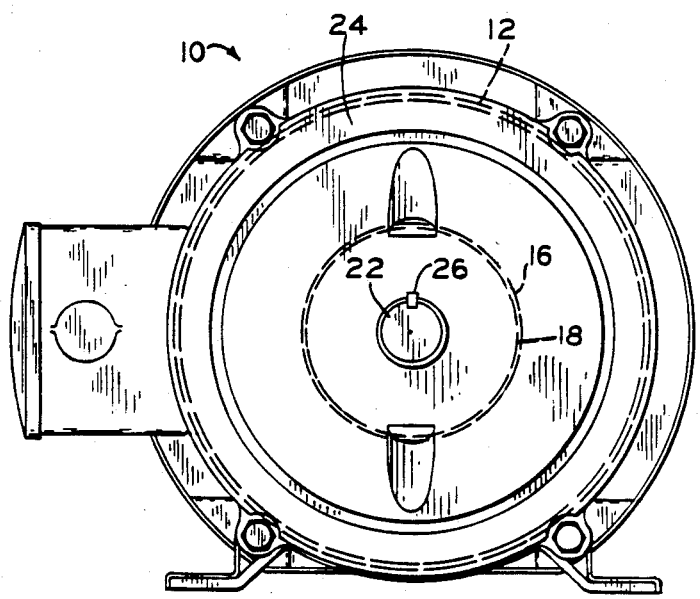
FIG. 2 is a front view of the machine in FIG. 1.

FIG. 1 shows a side view, in section, of a dynamo-electric machine 10 in which the present invention may be embodied. A front view of the machine 10 is shown in FIG. 2.

Basically, the machine 10 includes a generally cylindrical outer casing 12, and a generally cylindrical stator 14 fixed coaxially within the outer casing 12 and having a coaxial bore 16. A rotor 18 is supported by suitable bearings 20a, 20b at the front and the back of casing 12, to extend axially within the bore 16 and for rotational movement about the bore axis. In the particular example shown, a shaft part 22 of the rotor 18 extends axially from a front end shield 24 of the machine 10, and has a key 26 projecting radially outward from a recess cut axially a certain distance from the front of the shaft part 22. Key 26 serves to lock the shaft part 22 into a corresponding key way cut in a load member (not shown), e.g., a fan, to which rotational motive power is to be supplied by the machine 10.

A back end shield 28 (FIG. 1) together with the casing 12 and the front end shield 24 serve to contain and protect stator 14, rotor 18 and associated conductive windings. In the example shown, a machine cooling fan 30 is mounted on a rotor stub part 32 which extends outside the back end shield 28, and directs an air current flow over the casing.

As shown in FIG. 1, the stator 14 is comprised of a stack of plate laminations 34 of ferromagnetic material. The lamination plates 34 are stacked face-to-face and are held together to form a core by any of various means well known in the art. A number of slots extend along the axial length of the stator 14, and project radially from the bore 16. These slots accommodate stator windings that have end turns 36, parts of which are shown in FIG. 1. Details of individual plate laminations embodying the invention in a preferred form are given below.

As shown in FIG. 1, the shaft part 22 of the rotor 18 extends axially from the machine casing or housing 12 and has a stack of rotor laminations 40 fixed coaxially on the shaft part 22 intermediate the front and back bearings 20a, 20b. Sets of conductive bars 42 pass through a number of axially extending slots formed in the rotor 18 near the outer periphery of each of the laminations 40. The bars 42 are shorted to one another at the axial ends 44a, 44b of the rotor lamination stack by a set of end rings 46a, 46b.

In FIG. 1, the stator winding end turns 36 at axial end faces 48a, 48b, of the stator 14, are a source of stator flux leakage i.e. magnetic flux produced by the stator winding which does not interface with the conductive bars 42 in the rotor laminations 40. Inasmuch as stator flux leakage does not contribute to the resultant torque exerted on the rotor 18 when the stator winding or windings are energized, such flux leakage adversely affects the operating efficiency of the machine 10. It will therefore be understood that any means by which potential sources of stator flux leakage can be reduced or eliminated, are of great importance in dynamo-electric machine construction.

Certain machine construction standards are known in the industry, particularly those set out by ANSI/NEMA Standards Publication No. MG1-1987 (R1981). The entire contents of the cited publication are incorporated by reference herein.

The present invention aims to provide a dynamo-electric machine construction which conforms with industry standards, particularly with respect to the so-called 180 and 210 frame size constructions. It will be understood, however, that although dimensions for machine laminations disclosed herein will apply to the 180 and 210 frame sizes, the invention can be embodied with advantage in machines of various sizes and proportions.

Figure 3:
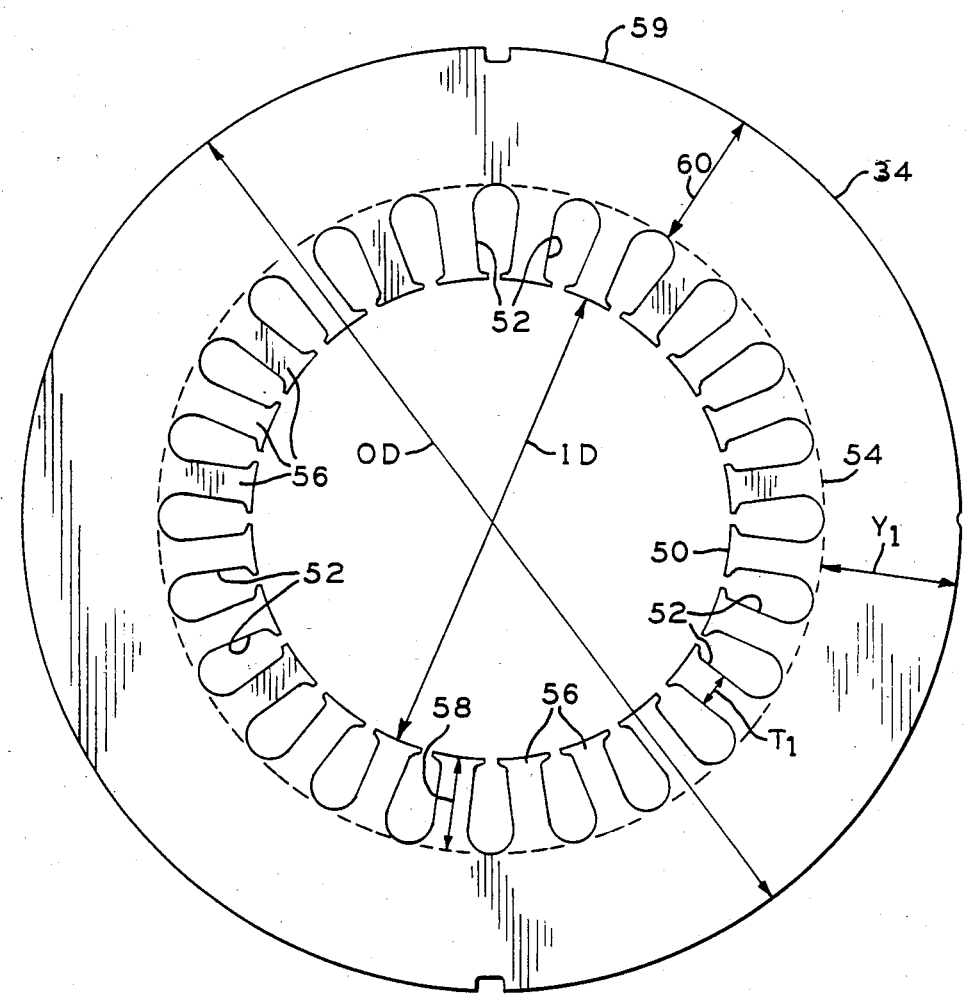
FIG. 3 is a plan view of a plate lamination for forming a stator core in the machine of FIGS. 1 and 2.
Figures 6, 7:
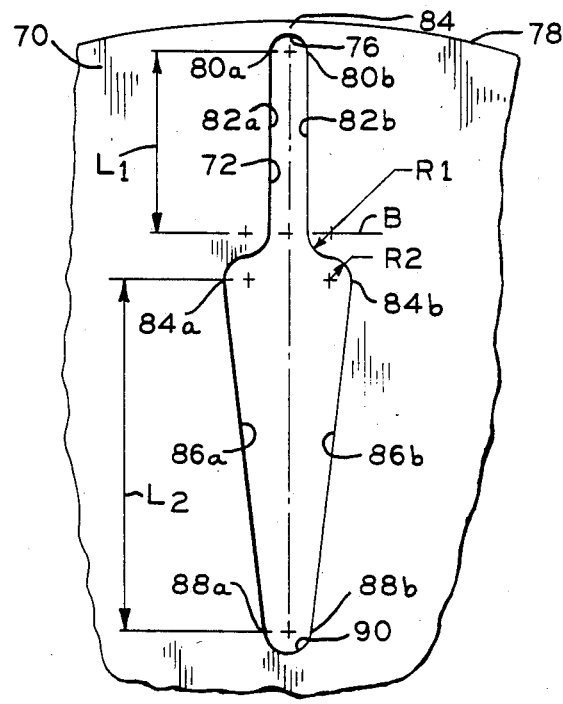
FIG. 6 is an enlarged view of a part of the rotor lamination in FIG. 5.
FIG. 7 is a table showing comparative data for physical relationships and ratios associated with the laminations of FIGS. 3 and 5 with the NEMA Standard 180 and 210 Frame sizes and 2-pole operation in relation to those of known laminations.

In FIG. 3, a stator plate lamination 34 for a 180 or 210 frame size according to the invention comprises a flat annular plate of ferromagnetic material having an outer diameter "OD" according to the tabular value of FIG. 7, and a generally circular bore opening 50 of a certain inner diameter "ID". The lamination plate 34 has a number which is 24 of equally circumferentially spaced slot openings 52 extending radially from an intermediate circumference 54 to form the number of teeth 56 which extend radially to the bore opening 50. In the embodiment of FIG. 3, the plate lamination 34 is a stator lamination so that the bore opening 50 defines one boundary for a stator-rotor air gap and a bore for receiving the rotor. The width of each stator tooth 56 is designated at $T_1$.

The slot openings 52 are formed to contain one or more stator windings which extend axially through the stator 14 when like ones of the lamination plates 34 are stacked face-to-face with corresponding slot openings 52 substantially aligned to communicate with one another. In the assembled machine 10 of FIGS. 1 and 2, the stator windings are arranged to correspond to an n (e.g. n=2, or 4, or 6, etc.) pole operating configuration for the machine 10. When the stator windings are connected to an outside electrical source, magnetic flux is produced next to the substantially aligned air gap peripheries or the stacked lamination plates 34 to interact with the conductive bars 42 of the rotor 18.

The annular lamination plate 34 in FIG. 3 includes a tooth portion 58 defined by the teeth 56 between the intermediate circumference 54 and the air gap periphery. The remainder of the lamination plate 34 is continuous between the intermediate circumference 54 and the outer periphery 59 to define a yoke portion 60 of the lamination plate 34.

Figure 4:
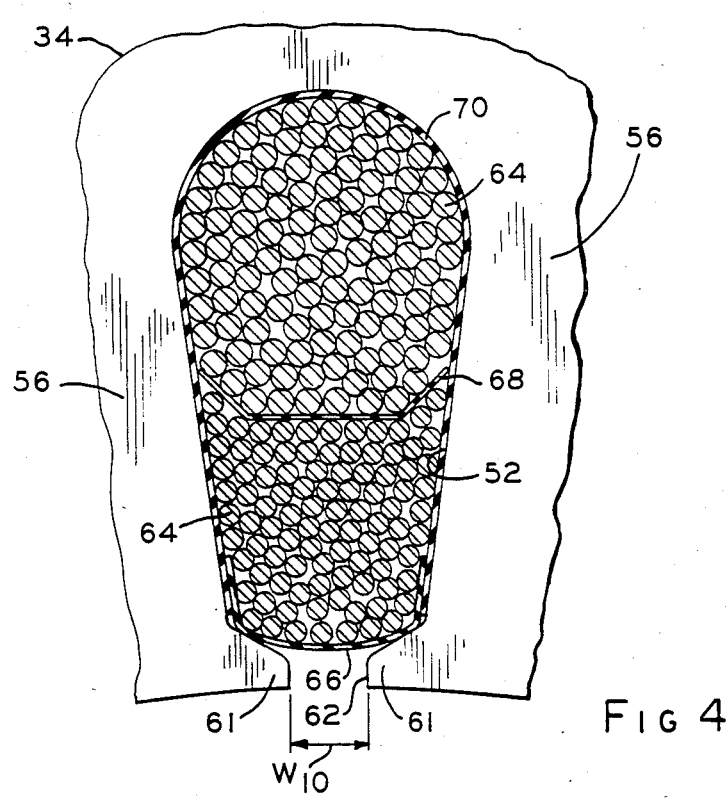
FIG. 4 is an enlarged view of a part of the stator lamination in FIG. 3.

FIG. 4 is an enlarged view of a part of the plate laminations 34 in FIG. 3. Specifically, a single slot opening 52 is shown surrounded by adjacent teeth 56. Lip parts 61 project circumferentially toward one another from the adjacent teeth 56, to define a mouth 62 of width $W_{10}$ of the slot opening 52. As is known, mouth 62 should be sufficiently wide to allow individual conductors 64 forming the stator winding to be inserted in the opening 52 through the mouth 62 when the machine 10 is assembled. The lip parts 61 act to seat a winding closure wedge 66 which holds the conductors 64 of the stator winding firmly in place within the stator slots formed by the openings 52. To separate individual stator windings, an insulating winding separator 68 may be positioned as shown in FIG. 4 in the stator slots, and an insulating film 70 positioned against the walls of the stator slots prevents arcing or short circuiting of individual conductors 64 with the material of which the laminations 34 are made.

According to one aspect of the invention, for a given ratio of inner diameter ID to outer diameter OD of the plate 34, the teeth 56 are sufficiently wide relative to the area of the slot openings 52 so that the ratio of flux density in the tooth portion 58 (FIG. 3) ($BT_1$) to flux density in the yoke portion 60 ($BY_1$) when the stator windings are energized, is substantially optimized for a given n pole operation of the stator windings. The actual number of slot openings is not critical. For example, the lamination plate 34 in FIG. 3 is shown with 24 slots and has the dimensions in FIG. 7 suitable for incorporation in a 180 or 210 frame size machine.

An underlying concept of the present invention is to utilize maximum amounts of ferromagnetic material (e.g., iron) for the lamination plates 34 and minimum amounts of winding conductors, e.g., the individual conductors 64 in a dynamo-electric machine having a desired power handling capability.

In the disclosed embodiment, the ratios of the tooth portions 58 to yoke portions 60 for the lamination plates 34 substantially differ from known constructions, as does the ratio of inner diameter to outer diameter of the lamination plates 34. The lip parts 61 thus become very small relative to the known structures as a consequence of the relatively wide teeth 56. Use of less winding material also results in smaller end turns (e.g., the stator end turns 36) at the end faces to the stator lamination stack, and, thus, undesired flux leakage is significantly reduced from that in the prior constructions.

Figure 5:
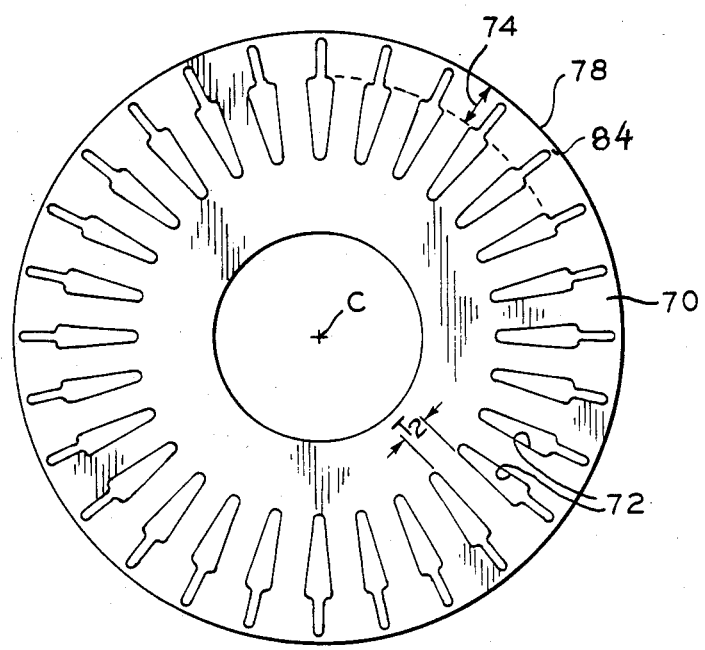
FIG. 5 is a plan view of another plate lamination for forming a rotor in the machine of FIGS. 1 and 2.

FIG. 5 is a plan view of a rotor lamination for a 180 or 210 frame size, according to the present invention. The rotor lamination is formed of a flat circular plate 70 of ferromagnetic material. The plate 70 has a number (e.g., 28 for n=2) of uniformly circumferentially spaced closed slots 72 extending symmetrically about radial center lines near the outer periphery of the plate 70. Rotor teeth formed between slots 72 have each a width $T_2$. Slots 72 are formed to contain conductive bars 42 (FIG. 1) which extend substantially parallel to the axis of the rotor 18 when the plates 70 are stacked face-to-face with the corresponding slots 72 substantially aligned to communicate with one another. Each of the slots 72 is substantially rectangular through an upper slot region 74, as shown in FIGS. 5 and 6. A curvilinear or semi-circular edge 76 of each slot 72, adjacent the outer circumference 78 of the plate, is symmetrical about the radial center line of the slot 72. The curvilinear edge has a semi-circular shape with a radius of between 0.625 mm. and 0.750 mm. End points 80a, 80b, of the semi-circular edge 76 are coincident with ends of spaced substantially parallel edges 82a, 82b of the plate 70. The edges 82a, 82b extend equal distances $L_1$ in the direction towards the center C of the rotor lamination plate 70. A bridge area 84 of the plate 70 is thus formed between the edge 76 and the outer circumference 78.

As seen in FIGS. 5 and 6, a top part of each slot 72 is defined by the edge 76 and the parallel edges 82a, 82b, opens into a bottom part of the slot which is substantially triangularly shaped and symmetrical about the radial center line. From a base line B, opposite ends of the edges 82a, 82b are curved continuously at a first radius $R_1$ to diverge outward from the center line over an arc of approximately 90 degrees, and then curve toward the center C of the plate 70 at a second radius $R_2$ over another approximately 90 degrees arc, as shown in FIG. 6, to a set of points 84a, 84b. From the latter set of points, spaced straight edges 86a, 86b of the plate 70 converge toward one another over a radially measured length $L_2$ toward the plate center C and terminate at points 88a, 88b. Another curvilinear or semicircular edge 90 joins the points 88a, 88b.

Reference is made hereto to "punched diameter" and "diameter" in the context of both stator and rotor laminations plates. In this context, "punched diameter" means "as punched" by a punch press and does not contemplate finishing operations for establishing air gap defining finished surfaces. For example, a rotor lamination plate diameter of about "102 mm." would be inclusive of a lamination plate having a nominal, as punched, diameter of 102 mm., as well as a rotor lamination stacked within a finished rotor and having a finished outer diameter somewhat less than 102 mm. so that a proper air gap will be maintained between the rotor and stator core of the machine 10.

Table 1, below, shows preferred values of dimensions for both the stator lamination plate 34 and the rotor lamination plate 70 for a 2-pole, 3-phase dynamo-electric machine 10 constructed according to the NEMA Standard 180 frame.

In the following tables $S_1$ is a number of stator slots; $S_2$ is a number of rotor slots, $T_1$ is a stator tooth width and $T_2$ is a rotor tooth width.

TABLE 1

| NEMA STANDARD 180 FRAME | |
|---|---|
| STATOR LAMINATION PLATE 34: | |
| Punched Outer Diameter | 203 mm. |
| Punched Inner Diameter | 102 mm. |
| Number of Slots 52 ($S_1$) | 24 |
| Tooth Width $T_1$ | 7.250 mm |
| Slot Width 62 ($W_{10}$) | 2.600 mm. |
| ROTOR LAMINATION PLATE 70: | |
| Punched Outer Diameter | 102 mm |
| Punched Inner Diameter | 34.468 mm |
| Number of slots 72 ($S_2$) | 28 |
| Radius of Edge 76 | 0.625 mm |
| Length $L_1$ | 6.113 mm |
| Radii $R_1$ and $R_2$ | 0.762 mm |
| Length $L_2$ | 11.644 mm |
| Radius of edge 90 | 0.762 mm |

Table 2, below, gives preferred values for the plates 34, 70 in a 2-pole, 3-phase NEMA Standard 210 frame.

TABLE 2

| NEMA STANDARD 210 FRAME | |
|---|---|
| STATOR LAMINATION PLATE 34: | |
| Punched Outer Diameter | 242 mm. |
| Punched Inner Diameter | 122 mm. |
| Number of Slots 52 ($S_1$) | 24 |
| Tooth Width $T_1$ | 8.500 mm. |
| Slot Width 62 ($W_{10}$) | 3.200 mm. |
| ROTOR LAMINATION PLATE 70: | |

TABLE 2-continued

NEMA STANDARD 210 FRAME

| | |
|---|---|
| Punched Outer Diameter | 122 mm. |
| Punched Inner Diameter | 42.836 mm |
| Number of slots 72 ($S_2$) | 28 |
| Radius of Edge 76 | 0.750 mm. |
| Length $L_1$ | 6.488 mm. |
| Radii $R_1$ and $R_2$ | 0.762 mm. |
| Length $L_2$ | 16.936 mm. |
| Radius of edge 90 | 0.762 mm. |

FIG. 7 is a table in which physical constants, relationships, and ratios associated with the laminations dimensioned according to the invention in Tables 1 and 2, are compared with the closest known prior configurations, for 2 pole AC induction motors with NEMA 180 and 210 sizes. For comparison with known values, the specific measurements have been converted into inches. Included in FIG. 7 is a value of the net and gross area of the slots in the stator multiplied by the number ($S_1$) of slots in the stator. The net slot area (ASLOT-NET) equals the gross slot area (ASLOT-GROSS, see FIG. 3) less the area occupied by the slot liners, separators, and wedges and less the area at the mouth not available for insertion of windings (see FIG. 4).

It will be seen from FIG. 7 that in addition to having a lower inner diameter to outer diameter ratio than in the prior corresponding laminations, the teeth width of the present laminations is generally greater than in prior laminations. The product of the number of rotor slots ($S_2$) times the rotor tooth width ($T_2$), divided by the product of the number of stator slots ($S_1$) times the stator toooth width ($T_1$) is, for the 180 and 210 sizes, preferably in the range of 0.825 to 0.90. In the examples of FIG. 7, the ratio in both cases is 0.850.

FIG. 7 provides specific values for various ratios which are used to define the improved lamination. The ratio ID/OD represents the ratio of the inner diameter of the stator lamination to the outer diameter and gives an indication of the larger amount of ferromagnetic material than copper which is used in the present laminations. The ratio Tl/Ts represents a ratio of tooth width ($T_1$) of the stator lamination to the bore circumference divided by the number of stator slots $S_1$, ($TS = \pi \times ID/S_1$). This effectively provides an indication of the tooth width. The value Btl/Byl can be used to represent the flux density in the tooth to the flux density in the yoke if it is assumed that the flux in the tooth and yoke is the same, which is a close approximation. This ratio gives an indication of tooth to yoke ratio. This ratio is also determinable geometrically from a stator lamination by the relatioship $Btl/Byl \times (\pi \times n \times Y1)/(S_1 \times T_1)$ where n is the number of poles, Y1 is the dimension shown in FIG. 3 and $S_1$ and $T_1$ are as defined above.

In order to compare specific ratios of the prior art lamination cross-sections with those of the present invention see the table below identical to FIG. 7.

| | LAMINATION CROSS SECTIONS | | | |
|---|---|---|---|---|
| | 180 FRAME 2 POLE | | 210 FRAME 2 POLE | |
| | PRIOR ART | PRESENT INVENTION | PRIOR ART | PRESENT INVENTION |
| OD (in) | 7.478 | 7.992 | 8.775 | 9.528 |
| ID/OD | .535 | .5025 | .556 | .504 |
| $T_1/T_s$ | .450 | .543 | .404 | .532 |
| $BT_1/BY_1$ | 1.144 | 1.101 | 1.142 | 1.100 |
| $S_2T_2/S_1T_1$ | .808 | .850 | .903 | .850 |
| $W_{10}$ (in) | .100 | .102 | .125 | .126 |
| $S_1$ (NUMBER OF STATOR SLOTS) | 36 | 24 | 36 | 24 |
| ($S_1$) × (A SLOT-GROSS) (in²) | 5.86 | 5.77 | 8.39 | 8.60 |
| ($S_1$) × (A SLOT-NET) (in²) | 4.77 | 4.95 | 6.56 | 7.50 |
| $S_2$ (NUMBER OF ROTOR SLOTS) | 28 | 28 | 26 | 28 |

It should be remembered that the resulting improved laminations are the result of an interaction of the various values. Thus, not each and every one of the values is consistently changed for each embodiment. The result, however, is consonant with the underlying concept of the present invention which, as mentioned, is to utilize maximum amount of lamination material and minimum amount of winding (i.e., copper) material.

Machines employing laminations configured according to the invention have yielded greater horsepower to volume ratios when compared with known corresponding machines. Of course, variations occur depending on efficiency. Table 3 below shows a comparison between percent efficiency and electromagnetic volume for 2 pole AC induction motors with laminations according to the present invention, and corresponding motors according to the prior art.

TABLE 3

| | % EFFICIENCY | | VOLUME (OD)²L* | |
|---|---|---|---|---|
| HP | PRIOR | NEW | PRIOR | NEW |
| 2-POLE AC INDUCTION MOTORS - 180 FRAME | | | | |
| 5 (LO EFF) | 87.2 | 86.9 | 2.75 | 2.27 |
| 5 (HI EFF) | 90.1 | 90.4 | 3.67 | 3.30 |
| 7.5 (LO EFF) | 87.5 | 87.7 | 3.21 | 2.68 |
| 7.5 (HI EFF) | 90.7 | 90.9 | 4.12 | 3.70 |
| 2-POLE AC INDUCTION MOTORS 210 FRAME | | | | |
| 10 (LO EFF) | 90.2 | 91.1 | 5.05 | 4.68 |
| 10 (HI EFF) | 91.5 | 93.3 | 5.99 | 7.61 |
| 15 (LO EFF) | 90.7 | 91.4 | 5.99 | 5.27 |
| 15 (HI EFF) | 92.0 | 92.4 | 5.99 | 7.03 |

*mm³ × 10⁶ Thus, tabular value 2.75 means 2.75 (10⁶) mm³; tabular value 2.27 means 2.27 (10⁶) mm³; etc.

Through the use of relatively wider teeth in the present laminations, flux density saturation for a given size and power machine can be achieved with a shorter lamination stack than in the prior constructions. Hence, the electromagnetic volume (OD)²L for machines according to the invention is generally lower than the volumes in the prior machines for about the same or even better efficiency. In the 10 HP hi efficiency motor a greater volume was used, but a rather substantial improvement in efficiency was achieved. For the hi efficiency 15 HP motor a cheaper steel was used which had greater losses so that even though there was a greater volume and only slight efficiency improvement, the cost saving was significant and could only be achieved using the present design. The use of wider or fatter teeth also produces a relatively higher flux density in the air gap between stator and rotor lamination stacks in machines according to the invention. Thus, more torque is produced from the rotor for a given machine size.

Terminology used herein such as "generally cylindrical", "essentially round", and "annular", with reference to or in connection with laminations (or plates) or structures made from such laminations (e.g. "cores", stators, etc.), is inclusively descriptive of laminations, cores, etc, that do not have "true round" configurations due to the presence of peripherally located "key slots", marker notches, flats resulting from production processes (such as occur from zig-zag punch lines, for example), and so forth.

While the foregoing description represents preferred embodiments of the invention, it will be obvious to those skilled in the art that various changes and modifications may be made, without departing from the spirit and scope of the present invention.

I claim:

1. A dynamo-electric machine comprising:
a generally cylindrical casing;
a stator core fixed in said casing and comprised of stator lamination plates of ferromagnetic material, said stator core having a cylindrical bore;
a stator winding embedded in stator slots radially projecting from the bore and which slots extend generally axially along the core, with end turns of said winding extending beyond end faces of said stator core;
a rotor supported in said bore for rotational movement and comprised of rotor lamination plates of ferromagnetic material, said rotor including conductive means for interacting with a magnetic field produced in an air gap between an outer periphery of said rotor and an inner periphery of the stator core when said stator winding is energized;
wherein each of said stator lamination plates comprises:
a flat annular plate of ferromagnetic material having a preselected outer diameter and a generally circular inner opening of a preselected inner diameter which forms the stator bore when like ones of said plates are stacked face-to-face with one another,
said plate having a number of uniformly circumferentially spaced slots which project radially outwardly from the bore to an intermediate circumference of said plate to define teeth between the slots, said slots forming said stator slots when corresponding slot openings in the like plates are substantially aligned to communicate with one another and the plates are stacked,
said annular plate including a tooth portion defined by said teeth between said intermediate circumference and said circular inner opening, and a yoke portion defined between said intermediate circumference and an outer periphery of said plate, and
wherein each of said rotor lamination plates comprises a flat circular plate of ferromagnetic material having a number of equally circumferentially spaced closed slots extending radially in a region near the outer periphery of said plate,
said slots being formed to contain conducting members which extend axially along the rotor when like ones of said plates are stacked face-to-face with corresponding slots in communication with one another; and
wherein for a given ratio of said preselected inner diameter to said preselected outer diameter for said annular plate of each of said stator lamination plates, said teeth are sufficiently wide relative to the area of said slot openings so that the ratio of flux density in said tooth portion to flux density in said yoke portion in response to energization of the stator winding is optimized for the number of poles n in the operating configuration of said stator winding; and
wherein the ratio of inner diameter to outer diameter of the annular plate forming said stator lamination plate is in the range of about 0.5025 to 0.504 for n equals 2.

2. The dynamo-electric machine of claim 1, wherein each of the rotor slots is defined by a curvilinear edge at an upper slot region adjacent the periphery of said rotor lamination plate and symmetrical about a radial center line, end points of the curvilinear edge being coincident with ends of spaced substantially parallel sides of the upper slot region, which sides extend equal distances in the direction toward the center of each of said rotor lamination plates to define with the cirvilinear edge a top part of the slot, said top part opening into a bottom part of the slot which is substantially triangularly-shaped and symmetrical about the radial center line.

3. The dynamo-electric machine of claim 1, wherein said stator winding is comprised of a minimum number of conductors contained in the stator slots for said operating configuration, so that flux leakage from said end turns at the end faces of said stator is substantially reduced.

4. The dynamo-electric machine of claim 1, wherein said ratio of flux density is from about 1.10.

5. The dynamo-electric machine of claim, 1, wherein the outer diameter of said stator lamination plate is about 203 mm.

6. The dynamo-electric machine of claim, 1, wherein the outer diameter of said stator lamination plate is about 242 mm.

7. The dynamo-electric machine of claim 2 wherein said spaced substantially parallel sides of the upper slot region of each rotor slot extend a distance in the range from about 6.113 mm. to 6.488 mm. and said bottom part of each rotor slot extends a distance in the range from about 11.644 mm. to 16.936 mm.

8. A dynamo-electric machine, comprising:
a rotor made from rotor lamination plates having a preselected number of slots of predetermined size;
a stator core made of stator lamination plates wherein the stator core is wound to provide for an operating configuration with a number of poles during stator winding energization, and wherein each stator lamination plate comprises:
a flat annular plate of ferromagnetic material having a given outer diameter and a generally circular bore opening of a certain inner diameter,
each said annular plate having a number of uniformly circumferentially spaced slot openings extending radially from an intermediate circumference of said plate to form a number of teeth which extend radially to an air gap periphery of said plate,
wherein said slot openings are formed to contain electrically conducting elements which extend axially through the lamination stack when like ones of the annular plates are stacked face-to-face with corresponding slot openings in communication with another, said conducting elements being arranged to correspond to said n pole operating configuration, and magnetic flux is produced around the conducting elements when electric current energizes the conducting elements, said annular plate including a tooth portion defined by said teeth between said intermediate circumference and said circular bore opening, and a yoke portion defined by a substantially continuous surface of said plate between said intermediate circumference and an outer periphery of said plate radially opposite said bore opening, and wherein each of said rotor lamination plates comprises:

a flat circular plate of ferromagnetic material having a number of equally circumferentially spaced closed slots extending radially in a region near the outer periphery of said plate, said slots being formed to contain conducting members which extend substantially axially along the rotor when like ones of said plates are stacked face-to-face with corresponding slots in communication with one another, and wherein the product of the number of said slots of each of said rotor lamination plates times the width of a rotor tooth is a first value, the product of the number of stator slots times the width of the stator teeth is a second value, and the ratio of the first value to the second value is the range of 0.825 to 0.90.

9. The dynamo-electric machine of claim 8, wherein each of said slots of each of said rotor lamination plates is defined by a curvilinear edge at an upper slot region adjacent the periphery of the circular plates and symmetrical about a radial center line, end points of the curvilinear edge being coincident with ends of spaced substantially parallel sides of the upper slot region, which sides extend equal distances inn the direction toward th center of said circular plate to define with the curvilinear edge a top part of the slot, said top part opening into a bottom part of the slot which is substantially triangular-shaped and symmetrical about the radial center line.

10. The dynamo-electric machine of claim 9, wherein said curvilinear edge of each closed slot in said rotor lamination plates is semi-circular with a radius in the range from about 0.625 mm. to 0.750 mm.

11. The dynamo-electric machine of claim 9, where said curvilinear edge of each closed slot in said rotor lamination plates is semi-curvilinear with a radius in the range of from about 0.625 mm. to 0.750 mm.

12. The dynamo-electric machine of claim 9, wherein said spaced substantially parallel sides of the upper slot region of each rotor slot extend a distance in the range from about 6.113 mm. to 6.488 mm. and said bottom part of each rotor slot extends a distance in the range from about 11.644 mm. to 16.936 mm.

* * * * *